United States Patent
Ko et al.

(10) Patent No.: US 11,759,708 B2
(45) Date of Patent: Sep. 19, 2023

(54) METHOD FOR GAME SERVICE AND COMMANDER VOICE CHAT AND COMPUTING DEVICE FOR EXECUTING THE METHOD

(71) Applicant: NCSOFT Corporation, Seoul (KR)

(72) Inventors: Jung Youn Ko, Seongnam-si (KR); Byung Ju Kim, Seongnam-si (KR); Ju Hyoun Kim, Seongnam-si (KR); Ha Yun Song, Seongnam-si (KR); Ga Hee Yoo, Seongnam-si (KR); Hye Min Lee, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 181 days.

(21) Appl. No.: 17/382,846

(22) Filed: Jul. 22, 2021

(65) Prior Publication Data

US 2022/0023756 A1  Jan. 27, 2022

(30) Foreign Application Priority Data

Jul. 22, 2020  (KR) ......................... 10-2020-0090659

(51) Int. Cl.
*A63F 13/424* (2014.01)
*A63F 13/79* (2014.01)

(52) U.S. Cl.
CPC ............ *A63F 13/424* (2014.09); *A63F 13/79* (2014.09)

(58) Field of Classification Search
None
See application file for complete search history.

(56) References Cited

FOREIGN PATENT DOCUMENTS

| JP | 2002-346230 A | 12/2002 |
|---|---|---|
| KR | 10-2005-0012015 A | 1/2005 |
| KR | 10-2020-0076135 A | 6/2020 |

OTHER PUBLICATIONS

"Battlefield 2". From Wikipedia,. [online], [retrieved on Mar. 16, 2023], Retrieved from the Internet <URL:>. 11 pages. (Year: 2020).*
"Battlefield 2 review: Battlefiled 2: PC review" [online], [retrieved Mar. 16, 2023]. Retrieved from the Internet <URL https://www.cnet.com/reviews/battlefield-2-review/>. 9 pages. (Year: 2005).*
Communication dated Jan. 11, 2022, issued in Korean Application No. 10-2020-0090659.

* cited by examiner

*Primary Examiner* — Lawrence S Galka
(74) *Attorney, Agent, or Firm* — Sughrue Mion, PLLC

(57) ABSTRACT

A method for game service and a computing device for executing the same are disclosed. According to an embodiment, there is provided a method for game service performed in a computing device comprising one or more processors and a memory storing one or more programs executed by the one or more processors, the method comprising: receiving game log related information and a voice signal of a game user from a plurality of gaming devices, checking whether or not a preset voice control condition is satisfied based on the game log related information, and performing voice control of voice chat in which game users engage according to an utterance of a game leading user among the game users in a state where the voice control condition is satisfied.

18 Claims, 6 Drawing Sheets

METHOD FOR GAME SERVICE AND COMMANDER VOICE CHAT AND COMPUTING DEVICE FOR EXECUTING THE METHOD

CROSS-REFERENCE TO RELATED APPLICATION

This application claims the benefit under 35 USC § 119(a) of Korean Patent Application No. 10-2020-0090659, filed on Jul. 22, 2020, in the Korean Intellectual Property Office, the entire disclosure of which is incorporated herein by reference for all purposes.

BACKGROUND

1. Field

The disclosed embodiments relate to voice control technology during in-game chat.

2. Description of Related Art

Recently, a game is evolving in various ways, including evolving from a local game that is executed only within a gaming device to an online game that is executed by linking with other gaming devices or servers through a network. In addition, with the enhancement of hardware performance and network technology, the game is evolving so that the game can be executed not only on a personal computer or game console but also on a mobile device such as a smartphone, a tablet PC, etc.

Meanwhile, there is a problem in that it is difficult to check the content of utterance if several game users utter simultaneously when in-game game users play a game together while conducting voice chat. In particular, there is a problem in that if the content of an utterance of a game user who leads the game is not properly transmitted to other game users, the game cannot proceed smoothly.

SUMMARY

The disclosed embodiments are intended to provide a technique for accurately transmitting the content of an utterance of the game leading user during in-game voice chat.

According to an embodiment, there is provided a method for game service performed in a computing device comprising one or more processors and a memory storing one or more programs executed by the one or more processors, the method comprising receiving game log related information and a voice signal of a game user from a plurality of gaming devices, checking whether or not a preset voice control condition is satisfied based on the game log related information and performing voice control of voice chat in which game users engage according to an utterance of a game leading user among the game users in a state where the voice control condition is satisfied.

The checking may comprise checking the game leading user among the game users based on the game log related information, and checking whether or not a game progress situation satisfies the preset voice control condition based on the game log related information of the game leading user.

The checking whether or not the voice control condition is satisfied may comprise determining that the voice control condition is satisfied when a character of the game leading user is located on a preset map at a preset time.

The checking whether or not the voice control condition is satisfied may comprise determining that the voice control condition is satisfied when a character of the game leading user is located within a predetermined distance from a preset target in the game.

The checking whether or not the voice control condition is satisfied may comprise determining that the voice control condition is satisfied when a character of the game leading user enters a preset content in the game.

The performing the voice control may comprise adjusting one or more of a voice volume and a timbre of the game leading user among the game users in the voice chat differently from other game users.

The performing the voice control may comprise adjusting the voice volume of the game leading user among the game users in the voice chat may to be higher than that of other game users.

The performing the voice control may comprise when a plurality of game leading users utter, checking authority ranking among the uttering game leading users and adjusting one or more of a voice volume and a timbre of the game leading user having the highest authority ranking among the game leading users differently from other game users.

The performing the voice control may comprise transmitting a synthesized voice signal by increasing a voice volume of the game leading user to be higher than a voice volume of other game users other than the game leading user among the game users in the voice chat when the synthesized voice signal is transmitted to the other game users.

The performing the voice control may comprise transmitting a synthesized voice signal by increasing a voice volume of other game users other than the game leading user among the game users in the voice chat to be higher than a default setting value when the synthesized voice signal is transmitted to the game leading user.

According to another embodiment, there is provided a computing device that comprises one or more processors and a memory storing one or more programs executed by the one or more processors, the computing device including a condition checker configured to receive game log related information and a voice signal of a game user from a plurality of gaming devices and check whether or not a preset voice control condition is satisfied based on the game log related information and a voice controller configured to perform voice control of voice chat in which game users engage according to an utterance of a game leading user among the game users in a state where the voice control condition is satisfied.

The condition checker is further configured to check the game leading user among the game users based on the game log related information and check whether or not a game progress situation satisfies the preset voice control condition based on the game log related information of the game leading user.

The condition checker is further configured to determine that the voice control condition is satisfied when a character of the game leading user is located on a preset map at a preset time.

The condition checker is further configured to determine that the voice control condition is satisfied when a character of the game leading user is located within a predetermined distance from a preset target in the game.

The condition checker is further configured to determine that the voice control condition is satisfied when a character of the game leading user enters a preset content in the game.

The voice controller is further configured to adjust one or more of a voice volume and a timbre of the game leading user among the game users in the voice chat differently from other game users.

The voice controller is further configured to adjust the voice volume of the game leading user among the game users in the voice chat to be higher than that of other game users.

The voice controller is further configured to when a plurality of game leading users utter check authority ranking among the uttering game leading users, and adjust one or more of a voice volume and a timbre of the game leading user having the highest authority ranking among the game leading users differently from other game users.

The voice controller is further configured to transmit a synthesized voice signal by increasing a voice volume of the game leading user to be higher than a voice volume of other game users other than the game leading user among the game users in the voice chat when the synthesized voice signal is transmitted to the other game users.

The voice controller is further configured to transmit a synthesized voice signal by increasing a voice volume of other game users other than the game leading user among the game users in the voice chat to be higher than a default setting value when a synthesized voice signal is transmitted to the game leading user.

According to the disclosed embodiment, when the game progress situation is in a specific condition, the voice volume of the game leader user is adjusted to be higher than the voice volume of the general game user, thereby capable of communicating more smoothly during the game while conducting voice chat.

DETAILED DESCRIPTION

Figure 1:
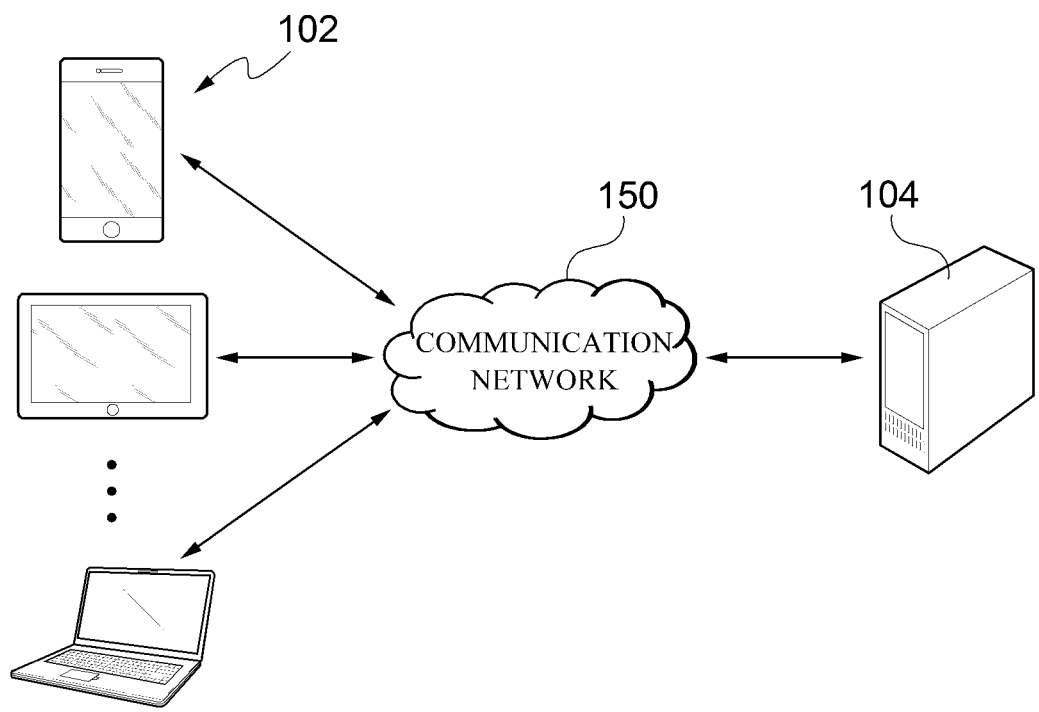
FIG. 1 is a block diagram illustrating a configuration of a game service system according to an exemplary embodiment.

Hereinafter, a specific embodiment will be described with reference to the drawings. The following detailed description is provided to aid in a comprehensive understanding of the method, apparatus, and/or system described in this specification. However, this is only an example and is not limited thereto.

The terms used in the detailed description are only for describing embodiments, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, parts or combinations thereof, other than those described.

In the description below, the terms "transfer", "communication", "transmission", "reception", and other similar meanings of a signal or information includes not only direct transmission of the signal or information from one component to another component, but also transmission of the signal or information through another component. In particular, to "transfer" or "transmit" a signal or information to a component indicates that the component is a final destination of the signal or information and does not imply that the component is a direct destination. The same is true for "receiving" a signal or information. In addition, in this specification, when two or more pieces of data or information are "related", it means that when one data (or information) is acquired, at least a part of other data (or information) can be acquired based thereon.

Terms such as first and second can be used to describe various components, but the components are not limited by the terms. Terms are used for the purpose of distinguishing one component from another component. For example, a first component can be named as a second component, and similarly, the second component may also be named as the first component.

Hereinafter, a "game" means software that one or more gamers can enjoy using an input device mounted on or connected to a gaming device. In general, games are conducted in a manner such as directly manipulating a player character or manipulating the movement of an object in the game, and games may also be divided into genres such as role-playing, adventure, arcade, etc.

Hereinafter, a "gaming device" means hardware that executes game software, performs an operation according to user input through an input device, and output a result through an output device. For example, the "gaming device" may be in the form of a personal computer, a laptop computer, a game console, a smartphone, a tablet pc, and a wearable device such as a smart band or smartwatch. In addition, hardware that satisfies the definition as described above is construed interpreted as belonging to the gaming device.

Hereinafter, an "online game" means a game that should go through a network in order to play the game. In general, the online game means a game played between gamers through two or more gaming devices in a remote location connected to each other through a network or synchronized through a server. As long as the online game satisfies the definition as above, there is no limitation on the type of gaming device that executes the game. In addition to the game running on the personal computer or the game console, if a game running on a mobile device such as a smartphone or a game that is linked with a plurality of different gaming devices (including different types of gaming devices) or runs in the cloud satisfies the definition as above, the game is construed as belonging to the online game.

Hereinafter, an "input device" means a device for inputting data into the gaming device. For example, the "input device" may include an input device dedicated to game manipulation manufactured in the form of a joystick, mouse, keyboard, touch screen, hardware button or steering wheel, musical instrument, gun, glove, footrest, etc. In addition, various sensors (temperature sensor, infrared sensor, motion sensor, gyro sensor, acceleration sensor, gravity sensor, etc.)

installed on or linked to the gaming device, and a positioning system such as global positioning system (GPS) and indoor positioning system may also be included as an example of the input device.

FIG. 1 is a block diagram illustrating a configuration of a game service system according to an exemplary embodiment.

Referring to FIG. 1, a game service system 100 may include a plurality of gaming devices 102 and a game server 104. The plurality of gaming devices 102 are communicatively connected to the game server 104 via a communication network 150.

In some embodiments, the communication network 150 may include the Internet, one or more local area networks, wide area networks, cellular networks, mobile networks, other types of networks, or a combination of these networks.

One or more game applications can be installed on the gaming device 102. Here, the game application may mean a program installed in the gaming device 102 to provide a game service in conjunction with the game server 104. Each of the plurality of gaming devices 102 can be connected to the game server 104 to operate the same game application.

Each of the plurality of gaming devices 102 may include acoustic equipment (e.g., a microphone and a speaker or a headset, etc.) for performing voice chat between game users. A plurality of game users can proceed with the game while talking to each other through a voice chat function provided in the game.

Each of the plurality of gaming devices 102 can transfer game related log information and a voice signal of a game user to the game server 104. Here, the game related log information may include game identification information, an ID of a game user, and game progress situation related information. In addition, the game progress situation related information can include all information related to the game progress situation of an in-game character (i.e., game user's character). For example, the game progress situation related information may include location information of an in-game character, item acquisition information of the in-game character, and mission performance information of the in-game character.

Each of the plurality of gaming devices 102 may receive a synthesized voice signal of other game users from the game server 104. The synthesized voice signal can be output through sound equipment of the gaming device 102.

The game server 104 can provide a game service to each of the plurality of gaming devices 102 that connect to the game server 104. The game server 104 can receive game related log information and a voice signal of the game user from the plurality of gaming devices 102. The game server 104 can transmit the synthesized voice signal of other game users to each gaming device 102.

The game server 104 can perform voice control of the game user in the voice chat based on the game related log information and the voice signal of the game user. Here, the voice control may mean controlling one or more of the voice volume and the timbre of the game user differently from a default setting value.

Figure 2:
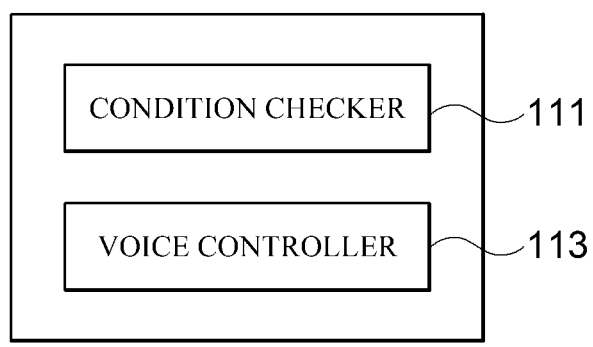
FIG. 2 is a block diagram illustrating a configuration of a game server according to an exemplary embodiment.

FIG. 2 is a block diagram illustrating a configuration of the game server 104 according to an exemplary embodiment. Referring to FIG. 2, the game server 104 can include a condition checker 111 and a voice controller 113.

The condition checker 111 can check whether or not a game progress situation of game users satisfies a preset voice control condition based on game related log information.

Specifically, the condition checker 111 can check a user (hereinafter, may be referred to as a game leading user) who has authority to lead the game among the game users based on the game related log information. For example, the condition checker 111 can check an ID of each game user of the game related log information to check a user who has authority to lead the game among game users. Here, the user who has authority to lead the game can be a case in which the character of the corresponding game user has a special status (e.g., monarch or guardian) in the game.

The condition checker 111 can check whether or not the game progress situation satisfies a preset voice control condition based on the game related log information of the game leading user. The condition checker 111 can check the game progress situation through the game progress situation related information of the game leading user.

In an exemplary embodiment, the condition checker 111 can determine that the voice control condition is satisfied when the character of the game leading user is located on a preset map at a preset time in the game. For example, in a game, a field boss (or boss monster) appears at a specific time on a specific map. In this case, the condition checker 111 can determine that the voice control condition is satisfied when the character of the game leading user is located at the corresponding time on the map where the field boss appears.

The condition checker 111 can determine that the voice control condition is satisfied when the character of the game leading user is located within a predetermined distance from a preset target in the game. For example, the condition checker 111 can determine that the voice control condition is satisfied when the character of the game leading user is located within a predetermined distance from the boss monster in the game.

The condition checker 111 can determine that the voice control condition is satisfied when the character of the game leading user enters a preset content in the game. For example, the condition checker 111 can determine that the voice control condition is satisfied when the character of the game leading user enters the content such as a siege.

The voice controller 113 can provide a voice chat function between the game users in the game. The voice controller 113 can adjust one or more of the voice volume and the timbre of the game user when the preset voice control condition is satisfied during voice chat between the game users in the game.

In an exemplary embodiment, when the preset voice control condition is satisfied, the voice controller 113 can differently adjust one or more of the voice volume and the timbre between the game leading user and the general game users (i.e., game users who do not have authority to lead the game) among the game users who engage in voice chat. That is, the voice controller 113 can differently adjust one or more of the voice volume and the timbre by distinguishing between the game leading user and the general game users among the game users who engage in voice chat.

The voice controller 113 can check whether or not the game leading user utters in a state where the preset voice control condition is satisfied. That is, the voice controller 113 can check whether or not the voice signal of the game leading user is input in a state where the voice control condition is satisfied. The voice controller 113 can differently adjust one or more of the voice volume and the timbre of the game leading user and the general game users during the time the game leading user utters in a state where the preset voice control condition is satisfied.

When the preset voice control condition is satisfied (e.g., when the character of the game leading user is located within a predetermined distance from the boss monster, the voice controller 113 can adjust the voice volume of the game leader among the game users who engage in voice chat to be higher than that of the general game user.

Figure 3:
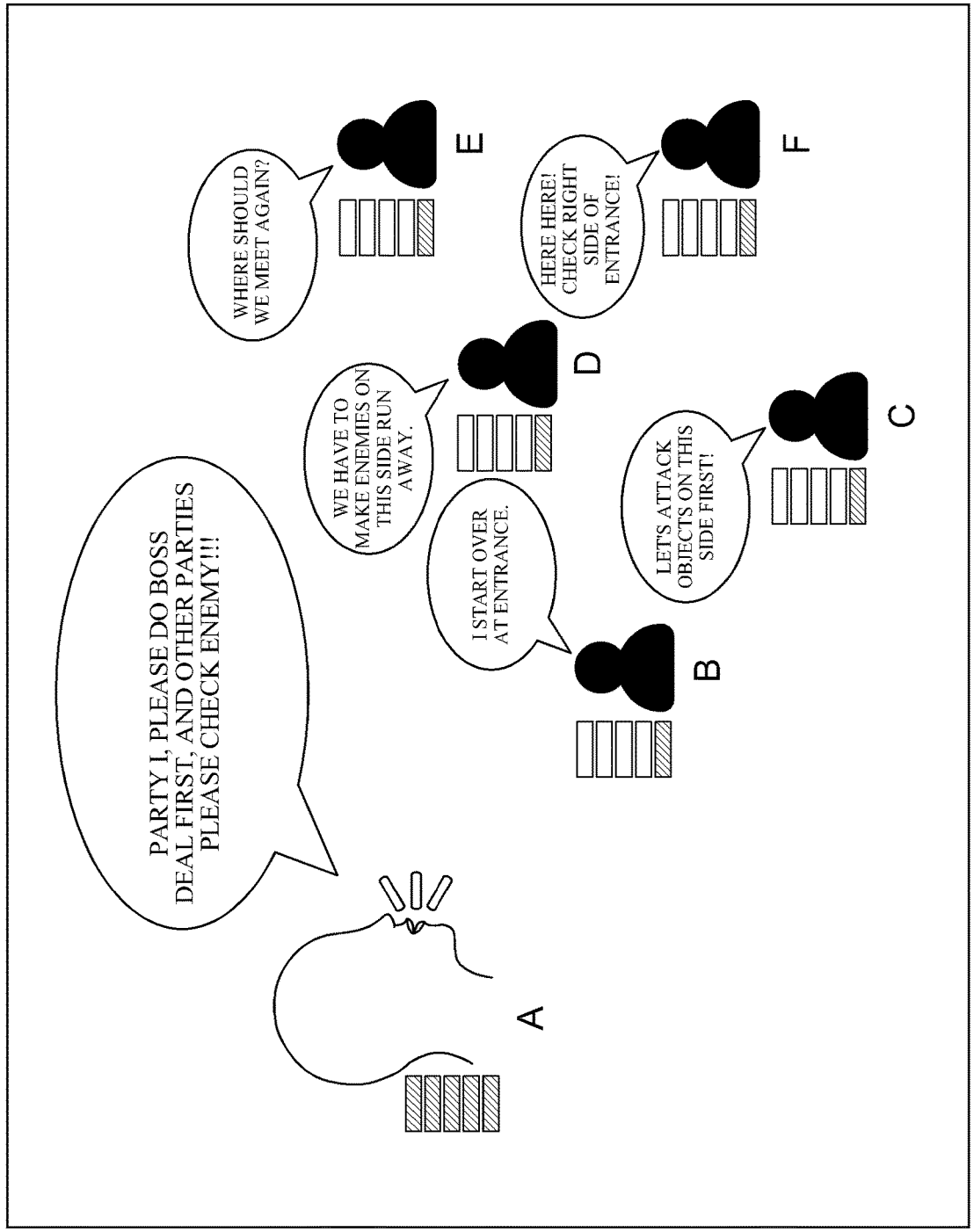
FIG. 3 is a diagram illustrating a state in which voice volume is adjusted differently between a game leading user and general game users in an in-game voice chat according to a disclosed embodiment.

FIG. 3 is a diagram illustrating a state in which the voice volume is differently adjusted between the game leading user and the general game user in in-game voice chat according to the disclosed embodiment.

Referring to FIG. 3, when a game leading user A utters in in-game voice chat, the voice volume of the game leading user can be adjusted to be higher than the voice volume of the general game user by setting the voice volume of the game leading user to level 5 and setting the voice volume of other general game to level 1.

As such, when the game progress situation is in a specific condition (that is, a preset voice control condition), it is possible to proceed with the game while communicating more smoothly when playing the game while conducting voice chat by adjusting the voice volume of the game leading user to be higher than that of the general game users.

Here, in setting the voice volume of the game leading user to be higher than the voice volume of the general game user (e.g., volume level 3), the voice volume of the game leading user may be made higher than a default setting value (volume up), and the voice volume of the general game user may be made lower than the default setting value (volume down). As another example, only the voice volume of the game leading user may be set to be higher than the default setting value, and the voice volume of the general game user may maintain the default setting value.

Meanwhile, when a plurality of game leading users utter in a state where the preset voice control condition is satisfied, the voice controller 113 can check authority ranking among the uttering game leading users and adjust the voice volume of the game leading user having the highest authority ranking to be higher than the voice volume of other game users (i.e., other game leading users and general game users).

That is, the authority to lead the game may also have the authority ranking. For example, in cases where the character of a "monarch" and where the game user is a "guardian", both the game users can have the authority to lead the game, but the game user whose character is the "monarch" can have higher authority than that of the game user whose character is the "guardian". In this case, when the game leading user whose character status is the "monarch" and the game leading user whose character status is the "guardian" utter together, the voice controller 113 can adjust the voice volume of the game leading user whose character status is the "monarch" to be higher than other game users.

Here, description is made in such a way that the voice volume of the game leading user is adjusted differently from other game users in the voice control, but is not limited thereto, and the timbre of the game leader user can be adjusted differently from other game users. For example, the voice controller 113 performs filtering on the voice signal of the game leading user to remove noise in a state where the preset voice control condition is satisfied, thereby capable of allowing the voice of the game leading user to be heard more clearly than the voices of other game users.

Here, there can be a variety of other methods other than that to adjust the timbre of the game leading user differently. For example, the voice controller 113 may change the timbre of the game leading user to a timbre of a preset voice. For example, when the voice control condition is satisfied, the voice controller 113 changes the timbre of the game leading user to a timbre other than the voice of the game leading user, thereby capable of allowing other game users to focus on the voice of the game leading user.

In addition, the voice controller 113 may apply preset sound effects to the timbre of the game leading user when the voice control condition is satisfied. For example, the voice controller 113 can apply sound effects such as reverb to the voice of the game leading user so that other game users focus on the voice of the game leading user. In addition, when the voice control condition is satisfied, the voice controller 113 may add an additional sound (e.g., a cue sound, etc.) to the voice of the game leading user.

Meanwhile, the voice controller 113 can synthesize voice signals of other game users and transfer the voice signals to the respective gaming devices 102 during in-game voice chat. In this case, the voice controller 113 can perform voice control differently depending on whether or not each game user has authority to lead the game and authority ranking.

Figure 4:
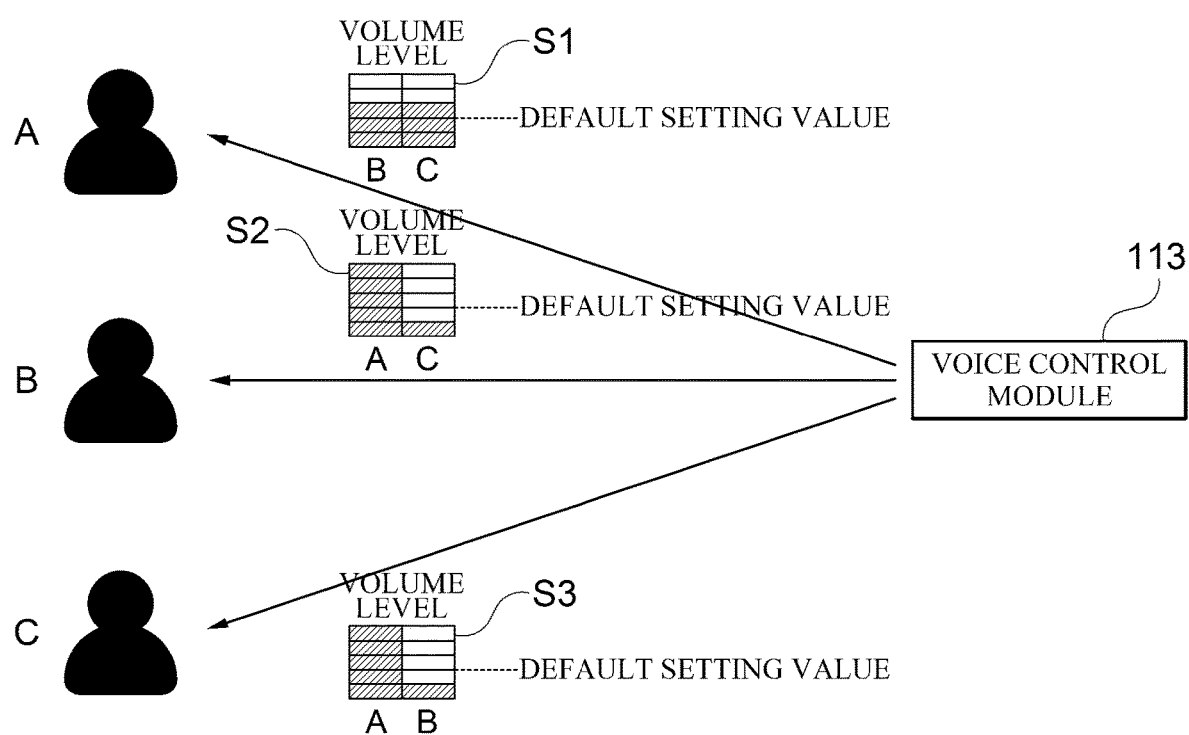
FIG. 4 is a diagram illustrating a state in which a voice controller synthesizes and transmits voice signals of other game users during in-game voice chat in the disclosed embodiment.

FIG. 4 is a diagram illustrating a state in which the voice controller 113 synthesizes and transmits voice signals of other game users during in-game voice chat according to a disclosed embodiment. Referring to FIG. 4, a case in which a game user A is a game leading user and a game user B and a game user C are the general game users will be described as an example.

The voice controller 113 can transmit a synthesized voice signal to each game user during voice chat between game users in a state where a preset voice control condition is satisfied. Here, the voice controller 113 transmits a voice signal S1, in which the voice signals of the game users B and C are synthesized, to the game user A, transmits a voice signal S2, in which the voice signals of the game users A and C are synthesized, to the game user B, and transmits a voice signal S3, in which the audio signals of the game users A and are synthesized, to the game user C.

When transmitting the synthesized voice signal S2 to the game user B, who is a general game user, the voice controller 113 can transmit the synthesized voice signal S2 by increasing the voice volume of the game user A, who is a game leading user, to be higher than that of the game user C, who is a general game user. In addition, when transmitting the synthesized voice signal S3 to the game user C, who is the general game user, the voice controller 113 can transmit the synthesized voice signal S3 by increasing the voice volume of the game user A, who is the game leading user, to be higher than that of the game user B, who is the general game user. That is, when transmitting a synthesized voice signal to a general game user other than a game leading user, the voice controller 113 can transmit the synthesized voice signal by increasing the voice volume of the game leading user to be higher than that of the general game user.

When transmitting the synthesized voice signal S1 to the game user A who is the game leading user, the voice controller 113 can transmit the synthesized voice signal S1 by increasing the voice volume of the game user B and game user C to be higher than a default setting value.

As such, when transmitting a synthesized voice signal to general game users during in-game voice chat, the synthesized voice signal is transmitted by increasing the voice volume of the game leading user to be higher than that of other game users, and accordingly, it is possible for the general game users to easily check the content of an utterance of the game leading user.

When transmitting the synthesized voice signal to the game leading user during in-game voice chat, by increasing the voice volume of the general game users higher than the default setting, the voice of other game users can be heard well by the game leading user himself/herself while uttering.

In this specification, a module may mean a functional and structural combination of hardware for carrying out the technical idea of the present invention and software for control and managing the hardware. For example, the "module" may mean a logical unit of predetermined codes and a hardware resource for allowing the predetermined code to be executed, and does not necessarily mean physically connected codes or one type of hardware.

Figure 5:
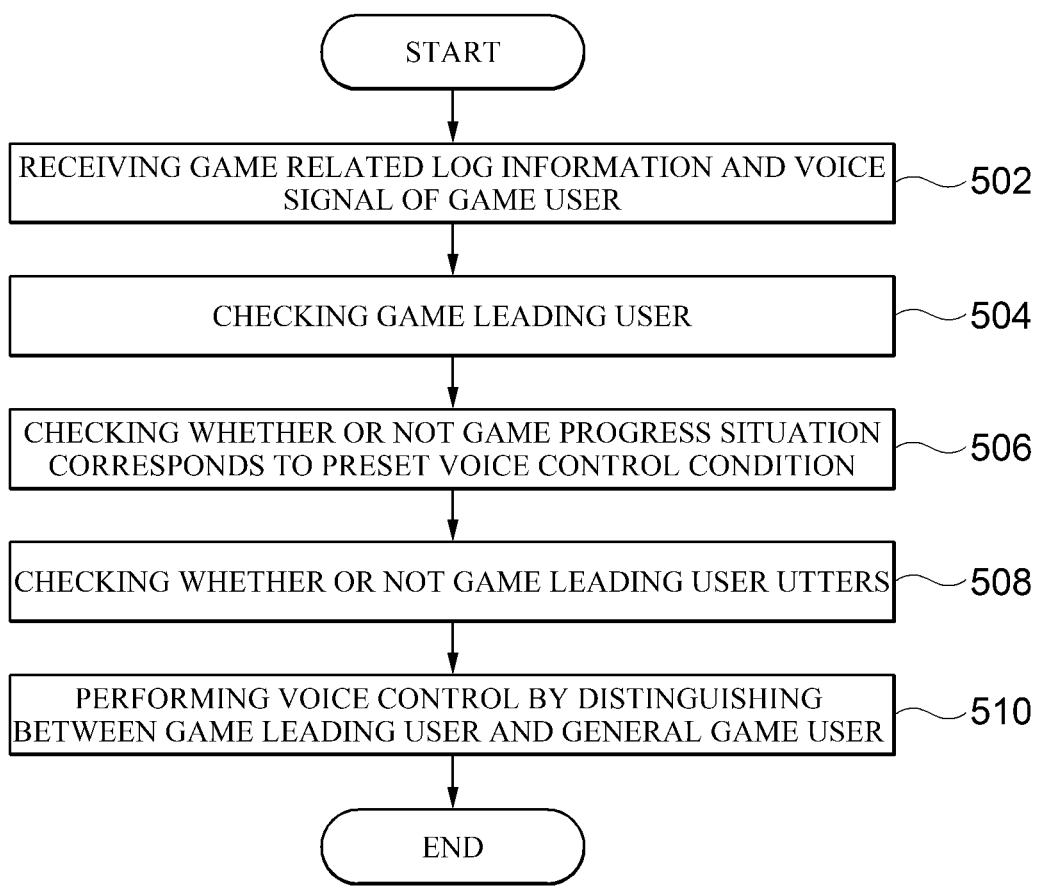
FIG. 5 is a flowchart for describing a method for game service according to an embodiment of the present invention.

FIG. 5 is a flowchart illustrating a method for game service according to an embodiment of the present invention. In the illustrated flowchart, the method is described by being divided into a plurality of steps, but at least some of the steps may be performed in a different order, performed together in combination with other steps, omitted, or performed by being divided into sub-steps, or performed by being added with one or more steps (not illustrated).

In step 502, the game server 104 receives game related log information and a voice signal of a game user from each of the plurality of gaming devices 102. The game related log information may include game identification information, an ID of a game user, and game progress situation related information.

In step 504, the game server 104 identifies a game leading user among game users based on the game related log information.

In step 506, the game server 104 checks the game progress situation through game progress situation related information of the game leading user, and checks whether or not the game progress situation corresponds to a preset voice control condition.

In step 508, when the preset voice control condition is satisfied, the game server 104 checks, among the game users who engage in voice chat, whether or not the game leading user utters.

In step 510, when the game leading user utters, voice control of differently adjusting one or more of the voice volume and timbre of the game leading user by distinguishing between the game leading user and the general game users among the game users who engage in voice chat is performed.

Figure 6:
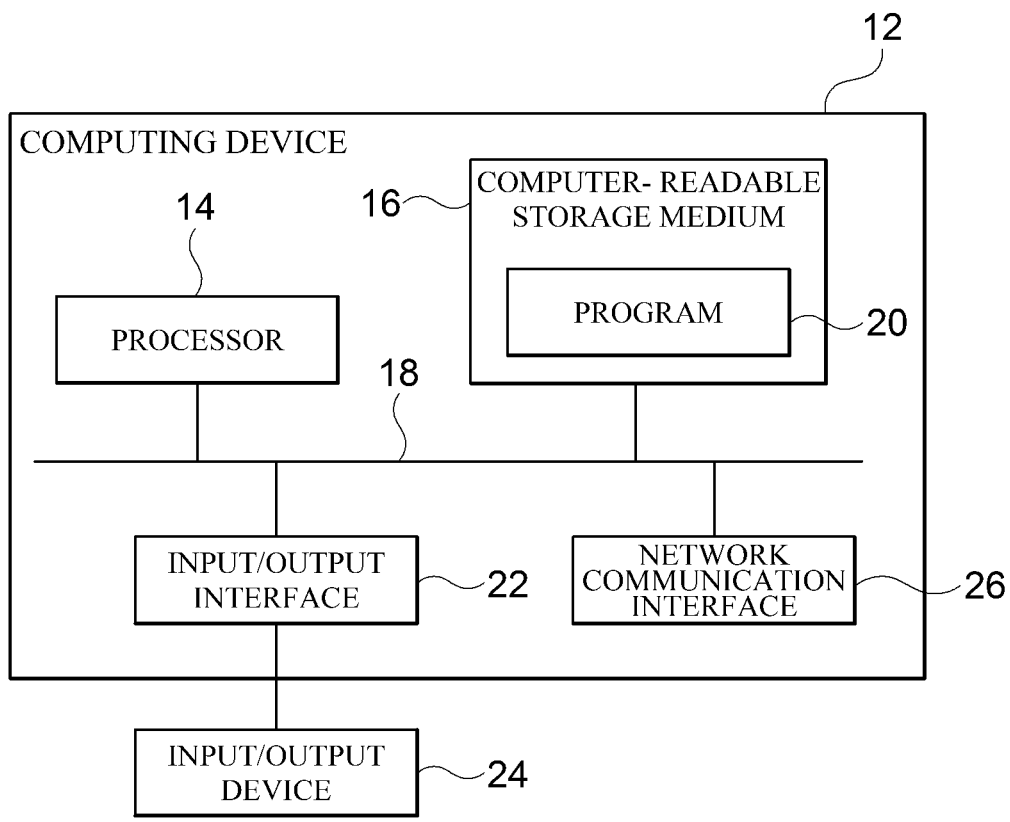
FIG. 6 is a block diagram illustratively describing a computing environment including a computing device suitable for use in exemplary embodiments.

FIG. 6 is a block diagram for illustratively describing a computing environment 10 that includes a computing device according to exemplary embodiments. In the illustrated embodiment, each component may have different functions and capabilities in addition to those described below, and additional components may be included in addition to those described below.

The illustrated computing environment 10 includes a computing device 12. In one embodiment, the computing device 12 may be a gaming device 102. In addition, the computing device 12 may be a game server 104.

The computing device 12 includes at least one processor 14, a computer-readable storage medium 16, and a communication bus 18. The processor 14 may cause the computing device 12 to operate according to the exemplary embodiment described above. For example, the processor 14 can execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A method for game service performed in a computing device comprising one or more processors and a memory storing one or more programs executed by the one or more processors, the method comprising:
   receiving game log related information and a voice signal of a game user from a plurality of gaming devices;
   checking whether or not a preset voice control condition is satisfied based on the game log related information; and
   performing voice control of voice chat in which game users engage according to an utterance of a game leading user among the game users in a state where the voice control condition is satisfied,
   wherein the performing the voice control comprises adjusting a voice volume of the game leading user among the game users in the voice chat is adjusted to be higher than that of other game users.

2. The method of claim 1, wherein the checking comprises:
   checking the game leading user among the game users based on the game log related information; and
   checking whether or not a game progress situation satisfies the preset voice control condition based on the game log related information of the game leading user.

3. The method of claim 2, wherein the checking whether or not the voice control condition is satisfied comprises:
determining that the voice control condition is satisfied when a character of the game leading user is located on a preset map at a preset time.

4. The method of claim 2, wherein the checking whether or not the voice control condition is satisfied comprises:
determining that the voice control condition is satisfied when a character of the game leading user is located within a predetermined distance from a preset target in the game.

5. The method of claim 2, wherein the checking whether or not the voice control condition is satisfied comprises:
determining that the voice control condition is satisfied when a character of the game leading user enters a preset content in the game.

6. The method of claim 1, wherein the performing the voice control further comprises:
adjusting a timbre of the game leading user among the game users in the voice chat differently from other game users.

7. The method of claim 1, wherein the performing the voice control comprises:
when a plurality of game leading users utter, checking authority ranking among the uttering game leading users; and
adjusting a voice volume of the game leading user having the highest authority ranking among the game leading users differently from other game users.

8. The method of claim 1, wherein the performing the voice control comprises:
transmitting a synthesized voice signal by increasing the voice volume of the game leading user to be higher than the voice volume of other game users other than the game leading user among the game users in the voice chat when the synthesized voice signal is transmitted to the other game users.

9. The method of claim 1, wherein the performing the voice control comprises:
transmitting a synthesized voice signal by increasing a voice volume of other game users other than the game leading user among the game users in the voice chat to be higher than a default setting value when the synthesized voice signal is transmitted to the game leading user.

10. A computing device that comprises one or more processors and a memory storing one or more programs executed by the one or more processors, the computing device comprising:
a condition checker configured to receive game log related information and a voice signal of a game user from a plurality of gaming devices, and check whether or not a preset voice control condition is satisfied based on the game log related information; and
a voice controller configured to perform voice control of voice chat in which game users engage according to an utterance of a game leading user among the game users in a state where the voice control condition is satisfied,
wherein the voice controller is further configured to adjust a voice volume of the game leading user among the game users in the voice chat to be higher than that of other game users.

11. The device of claim 10, wherein the condition checker is further configured to check the game leading user among the game users based on the game log related information, and check whether or not a game progress situation satisfies the preset voice control condition based on the game log related information of the game leading user.

12. The device of claim 11, wherein the condition checker is further configured to determine that the voice control condition is satisfied when a character of the game leading user is located on a preset map at a preset time.

13. The device of claim 11, wherein the condition checker is further configured to determine that the voice control condition is satisfied when a character of the game leading user is located within a predetermined distance from a preset target in the game.

14. The device of claim 11, wherein the condition checker is further configured to determine that the voice control condition is satisfied when a character of the game leading user enters a preset content in the game.

15. The device of claim 10, wherein the voice controller is further configured to adjust a timbre of the game leading user among the game users in the voice chat differently from other game users.

16. The device of claim 10, wherein the voice controller is further configured to when a plurality of game leading users utter, check authority ranking among the uttering game leading users, and adjust a voice volume of the game leading user having the highest authority ranking among the game leading users differently from other game users.

17. The device of claim 10, wherein the voice controller is further configured to transmit a synthesized voice signal by increasing the voice volume of the game leading user to be higher than a voice volume of other game users other than the game leading user among the game users in the voice chat when the synthesized voice signal is transmitted to the other game users.

18. The device of claim 10, wherein the voice controller is further configured to transmit a synthesized voice signal by increasing a voice volume of other game users other than the game leading user among the game users in the voice chat to be higher than a default setting value when the synthesized voice signal is transmitted to the game leading user.

* * * * *